UNITED STATES PATENT OFFICE.

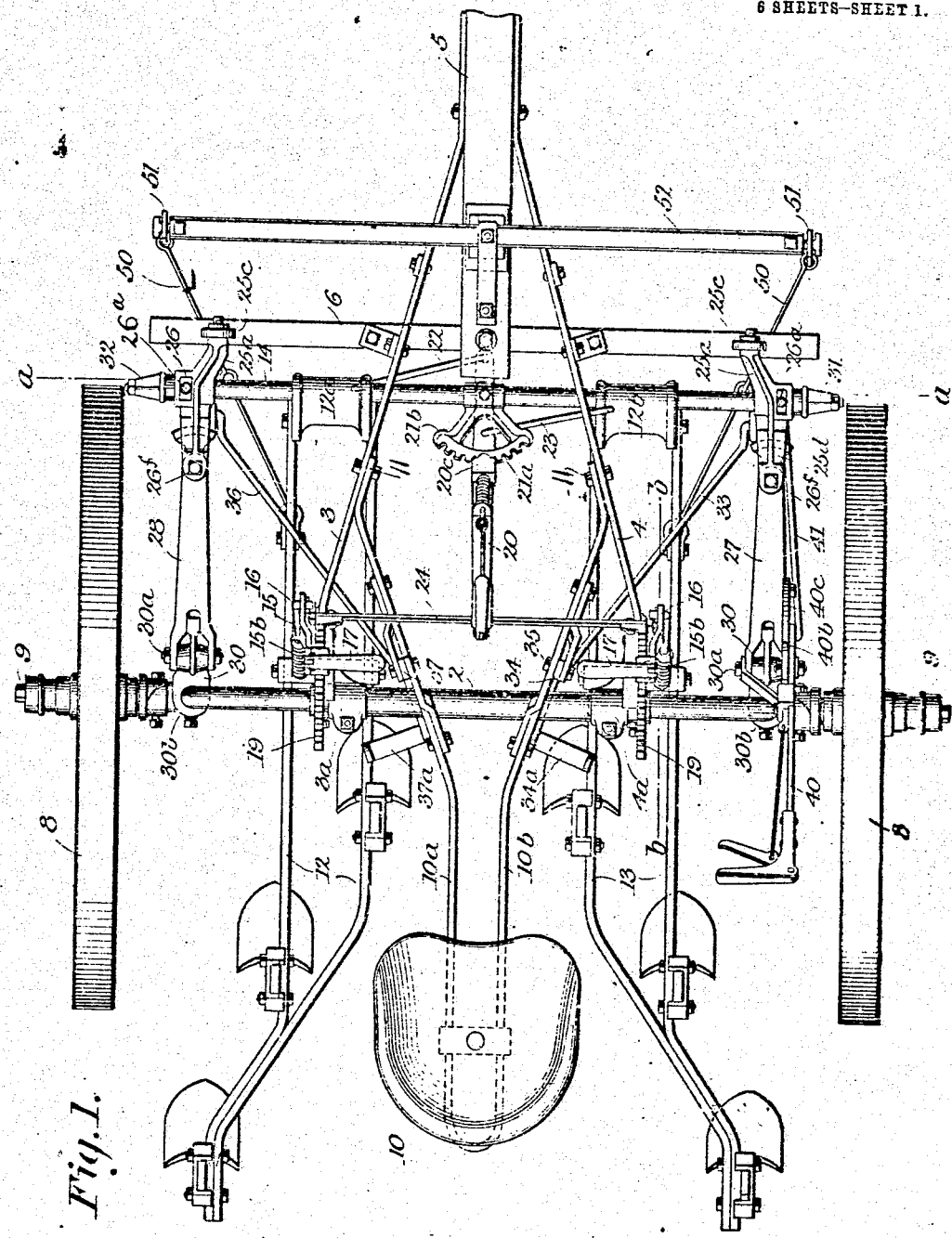

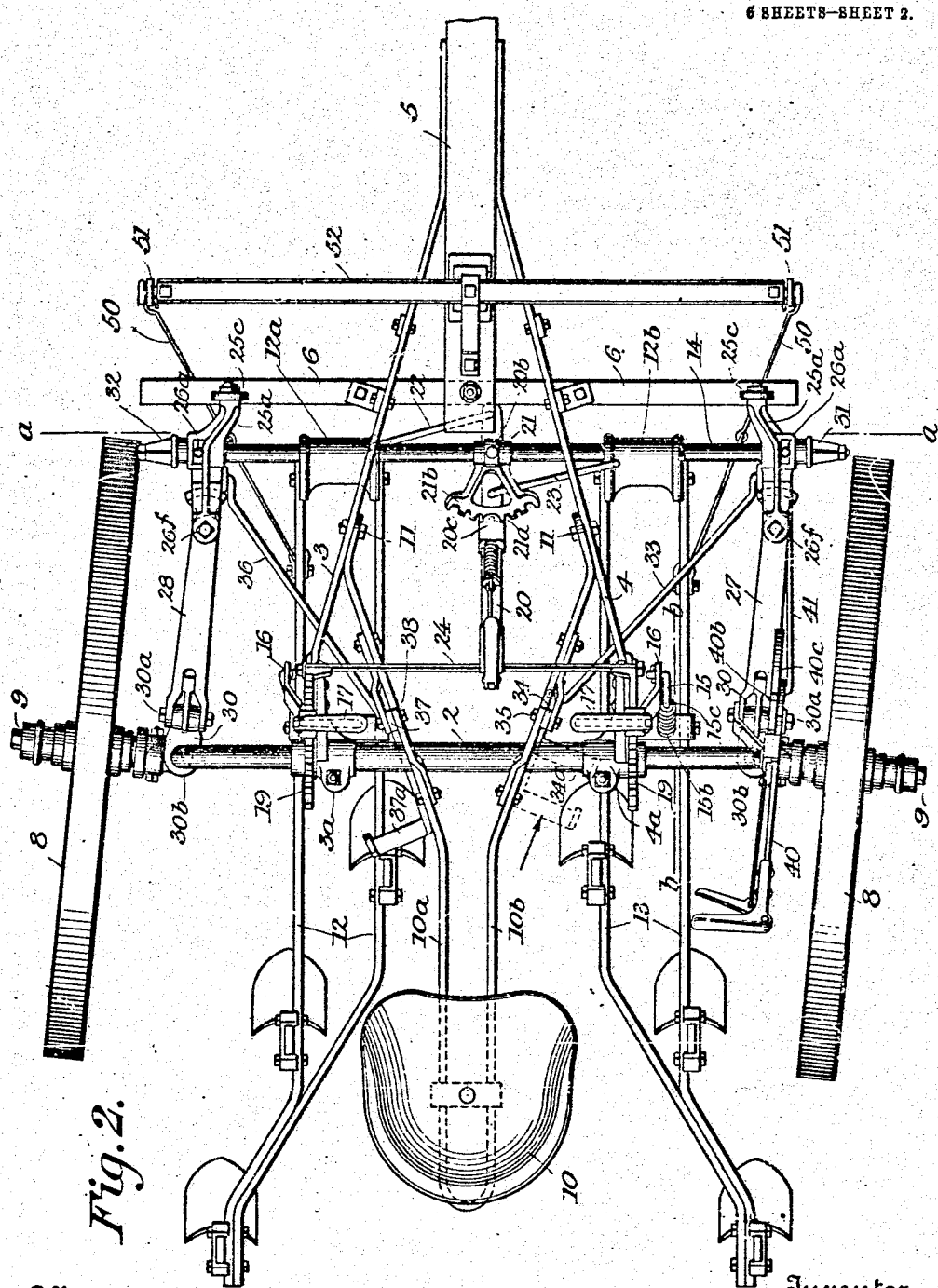

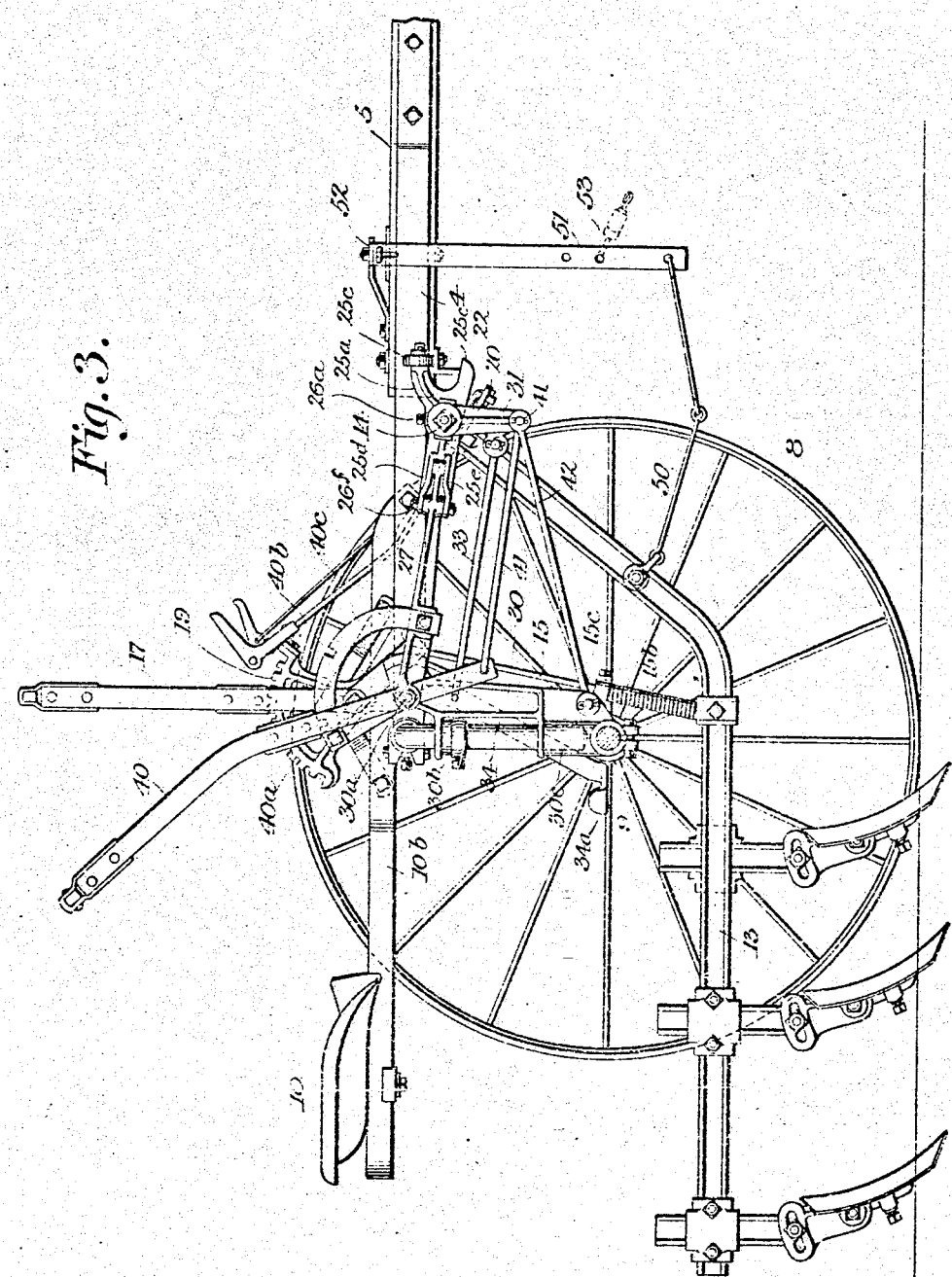

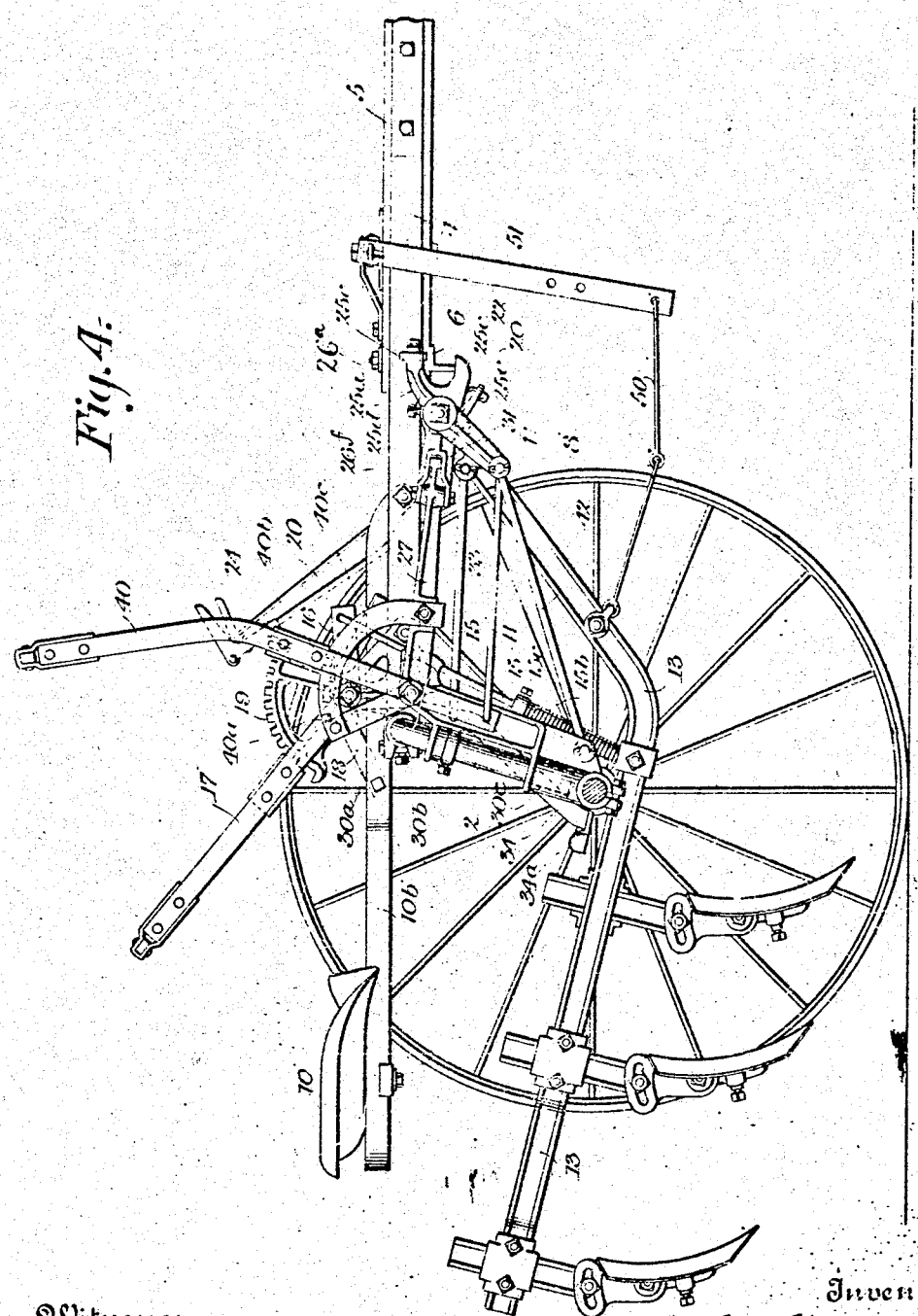

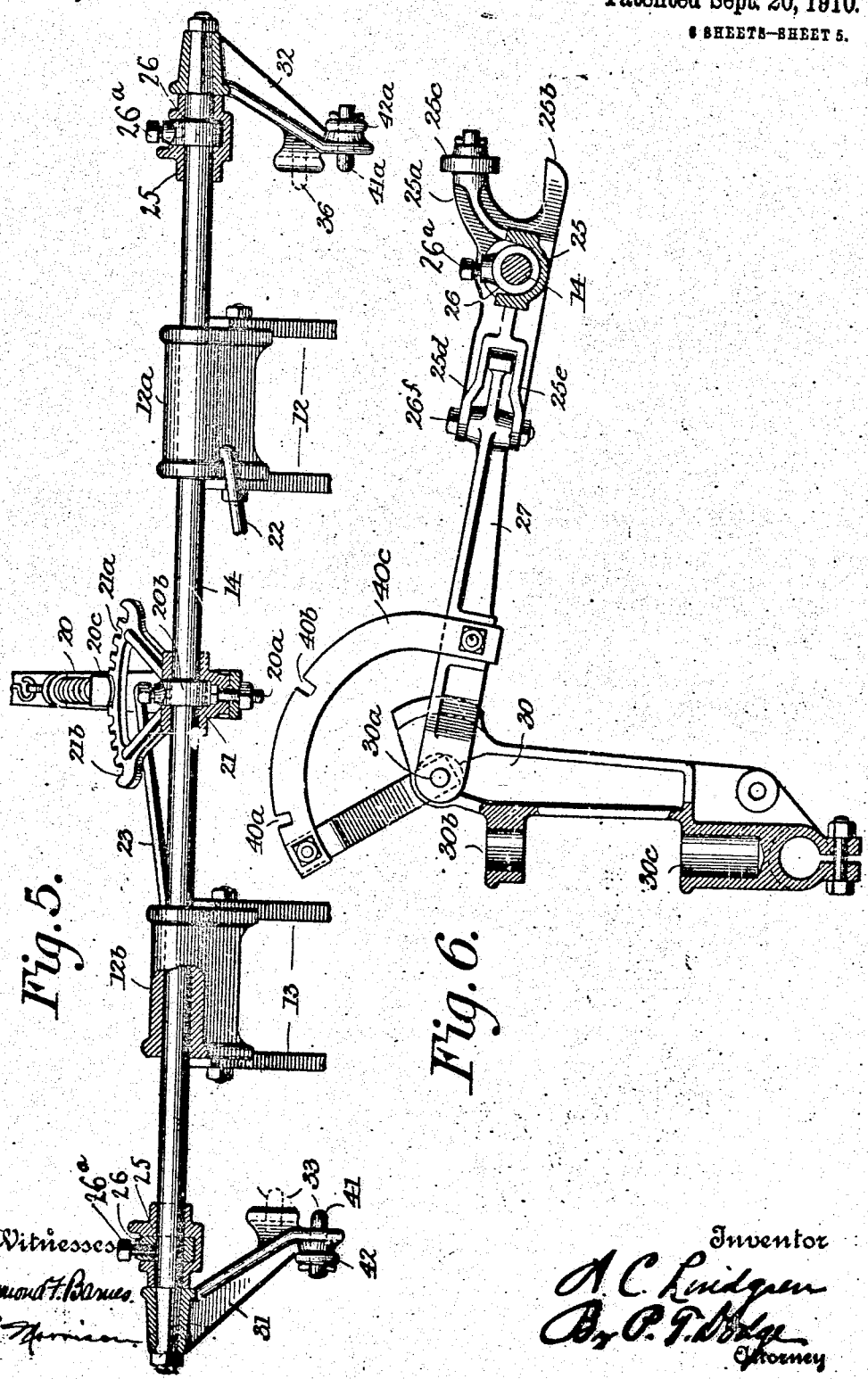

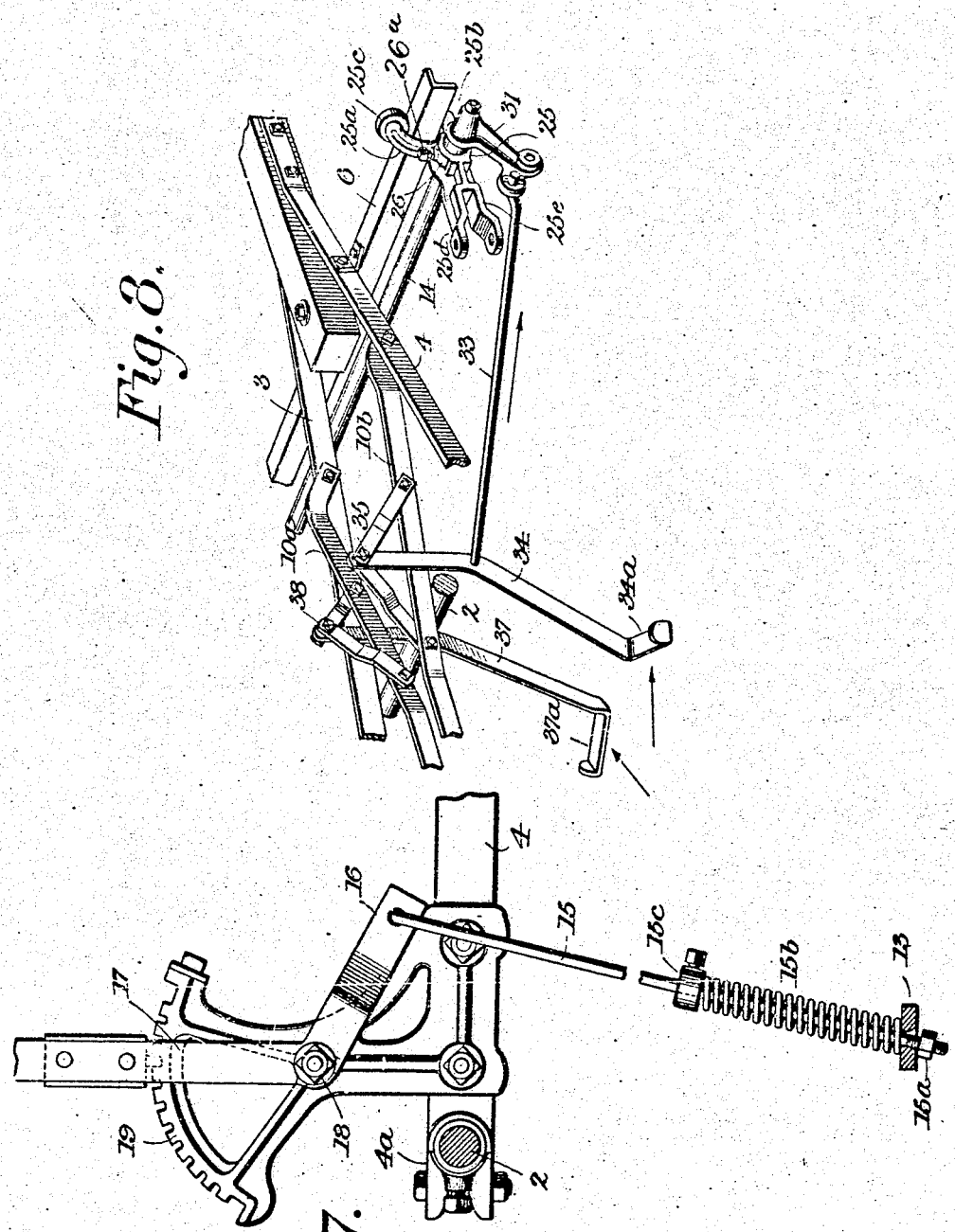

ALEXUS C. LINDGREN, OF MOLINE, ILLINOIS, ASSIGNOR TO MOLINE PLOW COMPANY, A CORPORATION OF ILLINOIS.

WHEELED CULTIVATOR.

970,515.  Specification of Letters Patent.  Patented Sept. 20, 1910.

Application filed April 22, 1908, Serial No. 428,523.   Renewed June 23, 1910.   Serial No. 568,491.

*To all whom it may concern:*

Be it known that I, ALEXUS C. LINDGREN, of Moline, county of Rock Island, and State of Illinois, have invented a new and useful Improvement in Wheeled Cultivators, of which the following is a specification.

This invention relates to wheel cultivators of the type in which the drag-bars are sustained by a wheeled frame in such manner that they may be moved laterally or guided by the feet of the driver to follow deviations in crooked rows of plants.

The invention consists in various improvements in machines of this character, designed mainly to render the lateral guiding movements of the beams very sensitive to the pressure of the driver's feet, so that he will be enabled to maintain perfect and effective control of the drag-bars, and may easily follow the irregularities and deviations in the rows. In my improved machine, the drag-bars are mounted so that they may be raised and lowered on a drag-bar frame or support, which frame or support is sustained by the main wheeled frame in such manner that the support may be shifted laterally by means of a lever mechanism, preferably operated by the feet of the driver, back and forth with reference to the wheeled frame, thereby carrying the drag-bars with it, and without varying the distance between them, and maintaining them facing squarely in the line of draft. Mechanism controlled by the lateral shifting motions of the drag-bar frame is provided for turning the ground wheels when the drag-bar frame is shifted, and in the same direction; whereby the machine itself will follow the direction in which the drag-bars are shifted. Means are provided for balancing the frame by shifting the ground wheels, which action will serve to lock the foot levers in such manner that they cannot be operated to swivel or turn the ground wheels; whereby the wheels will be maintained squarely in the line of travel when the machine is turned around or when it is traveling on the road. Means are provided also for adjusting the drag-bars to and from each other and with reference to the shifting drag-bar frame; whereby the distance between the drag-bars may be varied to conform to rows of different widths, and this while the cultivator is in action.

In the accompanying drawings: Figure 1 is a top plan view of my improved machine with the drag-bars and ground wheels traveling in the line of draft. Fig. 2 is a similar view showing the drag bars in the line of draft and the ground wheels deflected so as to follow irregularities in the rows. Fig. 3 is a side elevation of the machine showing the position of the ground wheels when the cultivator is in action. Fig. 4 is a similar view showing the drag-bars raised and the ground wheels thrown rearward to balance the machine. Fig. 5 is a section on the line $a$—$a$ of Figs. 1 and 2, longitudinally through the supporting shaft on which the drag-bars are mounted. Fig. 6 is a sectional elevation, the section being taken on a longitudinal line, and showing the pivotal connection of the drag bar support with the arched axle. Fig. 7 is a sectional elevation on the line $b$—$b$ of Figs. 1 and 2 showing the lever mechanism for raising and lowering the drag bars. Fig. 8 is a perspective view of the foot lever mechanism for guiding the drag bars laterally, showing the connection of the foot levers with the laterally movable drag bar supporting frame.

Referring to the drawings: 1 represents a wheeled frame comprising the arched axle 2, and horizontal fore and aft frame bars 3 and 4 connected at their rear ends to castings 3ª and 4ª loosely encircling and sustained by the arched portion of the axle, and connected rigidly at their forward ends to the sides of a draft tongue 5, and to a horizontal transversely extending guiding bar 6, extending beneath the tongue and the frame bars, and secured rigidly to the under side of the tongue. This frame is sustained by ground wheels 8 mounted on stub-axles 9, which latter are mounted loosely on the vertical ends of the arched axle in such manner that the stub-axles may rock thereon horizontally around a vertical axis, and thereby cause the ground wheels to travel at an angle with respect to the line of draft, as will be more fully described hereinafter.

The wheeled frame gives support to a driver's seat 10, fixed to the rear end of a seat frame, comprising two horizontal forwardly extending diverging bars 10ª and 10ᵇ, pivoted at their forward ends, as at 11, to the frame bars 3 and 4, respectively, and resting at a point between their front and rear ends, on the arched portion of the axle, whereby the weight of the driver is received and sustained directly by the ground wheels.

12 and 13 represent drag-bars or beams equipped with suitable cultivating devices, as usual, and extending upwardly at their forward ends, where they are connected respectively with sleeves or heads 12ª and 12ᵇ, mounted loosely so as to slide and also turn, on a horizontal transversely extending supporting shaft 14, sustained by and movable endwise with relation to the wheeled frame, as will be more fully described hereinafter, and constituting the main part of the drag bar frame before alluded to. In rear of their forward ends, the drag bars are suspended by means of vertical links 15 from the arched axle in such manner that by the raising and lowering of the links the drag bars may be correspondingly raised out of action or lowered into action. The links pass loosely through openings in the drag bars, and are provided on their lower ends with heads 15ª, adapted, when the links are raised to engage and lift the drag bars. Above the drag bars the links are encircled by spiral springs 15ᵇ bearing at their lower ends on the upper sides of the drag bars and at their upper ends against sleeves 15ᶜ fixed to the links, whereby when the links are forced down, they will act to apply, through the springs, a yielding downward pressure on the drag bars and will hold the cultivating tools yieldingly to their work. At their upper ends the links are pivoted to the forward ends of horizontal forwardly extending arms 16 on the lower ends of hand levers 17 pivoted, as at 18, to segment frames 19, which latter are fixed to the castings 3ª and 4ª, before alluded to, and are provided with locking teeth engaged by locking dogs on the levers, so that the drag bars may be raised and lowered independently and may be locked in their adjusted positions.

The heads 12ª and 12ᵇ, to which the forward ends of the drag bars are respectively connected, are joined to an adjusting lever 20, in such manner that by the operation of this lever, the heads may be moved to and from each other on their supporting shaft, so as to vary the distance or space between the drag bars. This lever is pivoted, as at 20ª, to the under side of a sleeve 21, provided with a vertical slot and loosely encircling the shaft 14, and held thereon against endwise movement by means of a collar 20ᵇ, fixed to the shaft and seated in the slot. At its lower end the lever has jointed to it the inner end of a transversely extending link 22, whose outer end is jointed to the head 12ª; while at the opposite side of the pivot 20ª, the lever has connected to it the inner end of a transverse link 23, having its outer end jointed to the head 12ᵇ, the result being that when the lever is swung to the right or left on its pivot, it will shift the two links 22 and 23 endwise, which action will in turn slide the heads 12ª and 12ᵇ to or from each other, according to the direction of movement of the lever, thereby imparting corresponding movements to the drag bars, which may be locked in their adjusted positions by means of a locking dog 20ᶜ on the lever engaging locking teeth 21ª on a segment frame 21ᵇ, fixed to and rising from the sleeve 21.

As shown in Figs. 3 and 4, the adjusting lever 20 extends rearwardly and upwardly within easy reach of the driver, and rests near its upper end on a horizontal guiding rod 24, connected rigidly to the segment frames 19, so that the lever is maintained in an upright position within reach of the driver, and is prevented from shifting on the shaft 14 out of the driver's reach, which it would otherwise do by reason of the loose connection between the sleeve 21 and shaft, such loose connection being necessary in order to permit the shaft to rock without rocking the lever, the rocking of the shaft being utilized, as will be presently described, as a means for shifting the ground wheels to balance the frame.

The supporting shaft 14, carrying the drag bars, is mounted loosely near its outer ends in horizontal openings respectively in yoke-frames 25, held against endwise movement on the shaft by sleeves 26, seated in slots in the frames and fixed to the shaft. These frames are provided with forwardly extending arms 25ª and 25ᵇ, the former carrying a roller 25ᶜ traveling on the top of the guide bar 6, while the latter extends beneath and bears on the under side of the guide bar, whereby the shaft is guided and confined in its endwise movements. On the opposite side of the shaft, the yoke-frames are formed with upper and lower rearwardly extending arms 25ᵈ and 25ᵉ, between which arms are pivoted, on vertical bolts 26ª, the forward ends of longitudinally extending horizontal links 27 and 28, respectively, the rear ends of which links are forked and embrace the upper ends of vertical swiveling frames 30, to which the links are respectively jointed by means of horizontal pivot bolts 30ª extending through their ends and through the frames. These vertical swiveling frames are provided near their upper ends each with a rearwardly extending ear 30ᵇ, containing a vertical bearing opening, through which openings the vertical ends of the arched axle loosely extend and have their lower extremities seated loosely in vertical bearing sockets 30ᶜ in the lower ends of the vertical frames, the construction being such that the frames may swivel or turn on the vertical ends of the axle on a vertical axis, the stub axles 9, before alluded to, being fixed to said frames below the sockets 30°, and projecting outward laterally to receive the ground wheels.

The links 27 and 28, by which the shaft 14 is connected with the arched axle, constitutes a "parallel motion", permitting the said shaft to shift endwise with relation to the main frame, and correspondingly moving the drag-bars laterally, without changing the rightangular relation of said shaft to the wheeled frame. As a result, the drag-bars face at all times squarely in the line of draft, without regard to their lateral shifting movements due to the lateral shifting of their supporting shaft. The shifting of the supporting shaft 14 endwise to thus move the drag-bars from side to side to follow crooked rows, is effected by the feet of the driver, by means of foot lever mechanisms, shown more particularly in Figs. 1 and 8. In these figures, it will be seen that the shaft has fixed to its opposite ends, depending arms 31 and 32, respectively, the arm 31 on the right having connected with it the forward end of a link 33, extending obliquely rearward toward the center of the machine with its rear end jointed to a vertical pendent lever 34, pivoted at its upper end, as at 35, on a horizontal oblique axis, to the seat frame bar 10$^b$ in advance of the arched axle, and having its lower end provided with a foot rest 34$^a$ to receive the right foot of the driver. The other arm 32 on the left end of the shaft 14, has jointed to it the forward end of a link 36, extending obliquely rearward toward the center of the machine, with its rear end jointed to a vertical pendent foot lever 37, pivoted at its upper end, as at 38, on a horizontal oblique axis, to the seat frame bar 10$^a$ in advance of the axle, and having its lower end provided with a foot rest 37$^a$ for the left foot of the driver. The obliquity of the axes 35 and 38 of the two foot levers is such that a forward pressure on the foot levers will cause the said levers to swing outward in the direction respectively of the oblique links 33 and 36, by which said levers are connected respectively with the arms on the ends of the shaft, with the result that said links will be moved endwise by the levers and will apply an endwise pressure to the supporting shaft, one of the levers moving idly inward, while the other is being forced outward, the latter causing the shaft to shift laterally with relation to the wheeled frame, in which action the rollers 25$^c$ will travel along the upper sides of the guide bar 6, and the yoke frames 25 will swing the parallel links 27 and 28 to one side, thereby swiveling the frames 30 on the vertical ends of the axle and turning the ground wheels at an inclination to the longitudinal axis of the machine.

In order that when the drag bars are elevated, their preponderating weight and that of the driver may be counterbalanced so as to prevent the tongue from tipping upward at the front, I propose to provide means for shifting the ground wheels backward with reference to the frame so as to change the center of gravity. This may be conveniently accomplished through the medium of the supporting shaft 14 by a rocking motion of said shaft acting through connections with the swiveling frames 30 carrying the ground wheels. As shown more particularly in Figs. 3 and 4, a hand lever 40 is pivoted on the axis 30$^a$ (which connects the link 27 with the vertical swiveling frame 30), which lever has jointed to its lower end, the rear end of a link 41, the opposite end of which is jointed to the arm 31 on shaft 14 by means of a bent finger on the end of the link extending laterally through an opening in the arm. The projecting end of this finger has the forward end of a rod 42 passed loosely over it, which rod extends rearwardly therefrom and has its rear end pivoted to the swiveling frame 30 near its lower end, the arm 32 at the opposite end of the shaft being similarly connected to the swiveling frame at that end of the machine by means of a rod 42$^a$, jointed at its forward end to the arm 32, and at its rear end to the frame. When now lever 40 is pushed forward, its lower end being swung to the rear, will draw link 41 rearward, thereby swinging the arm 31 to the rear, rocking the shaft 14, and swinging arm 32 also to the rear, which arms acting through links 42 and 42$^a$ will push the lower ends of the vertical swiveling frames to the rear, and thereby correspondingly move the ground wheels backward. As the arms 31 and 32 are in this manner thrown to the rear, they push back on the two oblique links 33 and 36, connecting said arms with the foot levers, with the result that these levers are jammed back against the arched portion of the axle, the effect of which will be to lock the foot levers against forward motion, by reason of the fact that a forward motion of either will be resisted by the axle acting as a stop in preventing the idle rearward motion of the other, which would necessarily follow. By this means, the ground wheels are prevented from swiveling when the balancing lever is operated to balance the machine, so that when the machine is turned at the ends of the rows, or is being transported on the road, the ground wheels are caused to travel straight forward.

Hand lever 40 is provided with a locking dog adapted to engage either of two notches 40$^a$ and 40$^b$ in a segment strap or frame 40$^c$, fixed to the link 27, the engagement of the dog in notch 40$^a$ serving to hold the wheels in the position they occupy when the machine is in action, and the engagement of the locking dog in the other notch serving to lock the wheels in their rearward position after the lever has been swung forward to balance the machine.

The draft of the animals is applied to the upwardly extending portions of the drag-bars by means of draft links 50, connected with the drag bars at this point, and connected also with pendent links 51, jointed at their upper ends to a doubletree 52 on the tongue, the pendent links having attached to them swingletrees 53.

By reason of the construction and arrangement of the foot lever mechanism described, and the form and arrangement of the beam support and its connection with the wheeled frame, the foot levers form a comfortable rest for the feet of the driver, who applies the power to shift the drag bars, by an easy and natural motion of the legs. The pressure is applied in the direction it is desired the beams shall shift, and not only results in the bodily shifting of both beams but the turning or swiveling of the ground wheels in the same direction, so that the guiding action is quick and most sensitive, enabling the driver to follow crooked rows with ease.

The manner of supporting and guiding the drag-bar support is such that a minimum amount of power applied to the foot levers is sufficient for this purpose. This follows from the fact that the shaft 14, on which the drag bars are mounted, is carried in its horizontal endwise movements, at the forward ends of the two horizontal longitudinally extending links 27 and 28, which pivot at their rear ends around the vertical ends of the arched axle. The force of the back-pressure on the drag bars, due to the resistance offered to the passage of the cultivating tools in the ground is exerted, therefore through the shaft 14, practically in line longitudinally with the links, and inasmuch as the lateral swing of these links is comparatively slight, this back pressure is never applied at such an angle on the links as to create a burdensome leverage. But comparatively little pressure on the foot levers is required, therefore, to overcome this back pressure in the shifting movements of the drag-bars. It is this fact coupled with the simultaneous swiveling of the ground wheels when the drag bars are shifted, that makes the guiding action sensitive and places the drag-bars under the perfect control of the driver.

By reason of the fact that the balancing lever is connected with the same arm on the shaft 14 that the foot levers have connection with, enables the driver, by pressure on the foot levers, to greatly aid in the action of restoring the ground wheels (after they have been swung back to balance the machine) to their former forward position, the foot levers in this action acting through links 33 and 36, arms 31 and 32, and rods 42 and 42ª on the vertical frames 30 carrying the ground wheels.

Having thus described my invention, what I claim is:—

1. In a cultivator, the combination of a wheeled frame, a drag-bar support movable transversely with reference to the same, drag-bars carried at their front by the support, means for maintaining the parallelism of said drag-bars, foot levers sustained by the frame and movable forwardly and outwardly, and connections between the foot levers and the drag-bar support.

2. In a cultivator, the combination of a wheeled frame provided with a transversely extending guiding member, a drag-bar support sustained by and movable transversely on said guiding member at the front, fore and aft links connecting the drag-bar support pivotally with the wheeled frame, drag-bars carried at their front by the support and movable transversely with said support in unison, means for maintaining the parallelism of said drag-bars, and a lever mechanism sustained by the frame and operatively connected with the drag-bar support.

3. In a cultivator, the combination of a wheeled frame, a transversely extending guiding bar fixed thereto, a transversely extending endwise movable drag-bar support 14, drag bars on said support, fore and aft yoke-frames mounted on the drag-bar support and slidingly sustained by the guiding bar, fore and aft links jointed respectively to said yoke-frames and to the wheeled frame on vertical axes, and a lever mechanism mounted on the frame and operatively connected with the drag-bar support.

4. In a cultivator, the combination of a wheeled frame, a transversely extending guiding bar fixed thereto, a transversely movable drag-bar support, arms on said support extending forwardly, rollers on said arms traveling on the guiding bar, rearwardly extending connections between the support and the wheeled frame, drag-bars on the support, and a lever mechanism sustained by the frame and operatively connected with the drag-bar support.

5. In a cultivator, the combination of a wheeled frame, a transversely movable drag-bar support sustained thereby, drag-bars carried by the support, foot levers mounted on the wheeled frame, and forwardly and outwardly extending rods connected respectively with said foot levers and with the drag-bar support.

6. In a cultivator, the combination of a wheeled frame, a transversely extending guiding bar fixed thereto, a transversely extending shaft in rear of the guiding bar and movable endwise with relation to the frame, fore and aft yoke-frames on the shaft, forwardly extending arms on the yoke frames slidingly sustained on the guiding bar, horizontally-swinging fore and aft links sustained by the wheeled frame and jointed at their forward ends to the yoke frames, drag-bars on the shaft, foot levers on the wheeled frame, and connections between the foot levers and the opposite ends of the shaft.

7. In a cultivator, the combination of a wheeled frame, a transversely extending guiding bar fixed thereto, a transversely movable drag-bar support, connections between the support and the wheeled frame at the rear of the support, forwardly extending arms on the support loosely embracing the guiding bar between them, drag-bars on the support, and a lever mechanism for moving the drag-bar support.

8. In a cultivator, the combination of a wheeled frame, a transversely movable drag-bar support sustained thereby, arms depending from the ends of said support, foot levers on the frame, rods connecting the foot levers with the arms, and drag-bars carried by the support.

9. In a cultivator, the combination of the wheeled frame, a transversely movable drag-bar support sustained thereby, drag-bars carried by said support, foot levers mounted on the frame on horizontal oblique axes so as to move forwardly and outwardly, and connections between the foot levers and the drag bar support.

10. In a cultivator, the combination of a wheeled frame, a transversely movable drag-bar support sustained thereby, pendent foot levers mounted on the frame to move forwardly and outwardly, and forwardly and outwardly extending rods connected at their rear ends with said foot levers and at their forward ends to the ends of the drag bar support.

11. In a cultivator, the combination of the main frame, a transversely movable drag-bar support, drag-bars on said support, horizontal ground wheel spindles mounted on the frame to swivel around vertical axes, fore and aft links jointed at their forward ends to the drag-bar support and operatively connected at their rear ends with the wheel spindles, and a lever mechanism for shifting the drag bar support transversely; whereby the horizontal movement of the fore and aft links, when the drag bar support is moved transversely, will swivel the ground wheels.

12. In a cultivator, the combination with the main frame, of the arched axle mounted therein, wheel carrying frames mounted on the vertical ends of the arched axle to swivel around vertical axes, parallel links extending forwardly from said wheel carrying frames, a transversely movable drag-bar support pivoted to the forward ends of said links, drag-bars on said support, and a lever mechanism sustained by the frame and operatively connected with the drag-bar support to move the same transversely.

13. In a cultivator, the combination of the main frame, wheel spindles movable rearward with reference to the frame to balance the same, a transversely extending rock shaft mounted in the frame and movable endwise, drag-bars carried by the shaft and movable transversely with the same, arms on the shaft, connections between the arms and the wheel spindles; whereby the rocking of the shaft will shift the spindles with reference to the main frame, a lever sustained by the frame, and connections between the lever and one of the arms on the shaft.

14. In a cultivator, the combination of the main frame, ground wheel spindles movable rearwardly with reference to the frame to balance the machine, a rocking drag-bar support, drag-bars carried thereby, means for rocking the support, and connections between the support and wheel spindles formed to cause the latter to be shifted with reference to the frame when the shaft is rocked.

15. In a cultivator, the combination of the main frame, ground wheel spindles movable with reference to the frame to balance the same, a drag-bar support movable transversely, drag-bars carried thereby, foot levers mounted on the frame and operatively connected with the drag-bar support for moving it transversely, and means controlled by the balancing movement of the wheel spindles for locking the foot levers against action.

16. In a cultivator, the combination of the main frame, ground wheel spindles movable back and forth with reference to the frame to balance the same and adapted to swivel on a vertical axis, a drag-bar support movable transversely, connections between the support and the wheel spindles; whereby the transverse movement of the support will swivel said spindles, foot levers mounted on the frame and operatively connected with the drag-bar support for moving it transversely, and means controlled by the balancing movement of the wheel spindles for locking the foot levers against action; whereby when the wheel spindles are moved to balance the frame in the transportation of the same on the road or in turning at the end of rows, the ground wheels will be locked against swiveling action.

17. In a cultivator, the combination of the main frame, ground wheel spindles movable back and forth with reference to the same, a transversely movable rocking drag-bar support, drag-bars thereon, arms 31 on said support, foot levers sustained by the frame and movable back and forth, connections between the foot levers and said arms operating to shift the drag bar support transversely when the foot levers are pushed forward, a balancing lever, a connection between said lever and one of the arms 31 for rocking the shaft, connections between said arms 31 and the wheel spindles; whereby when the wheel spindles are moved rearwardly by the balancing lever, the foot levers will be moved bodily rearward, and a fixed part of the frame coöperating with the foot levers when in their rearward position to act as a stop for the same; whereby the foot levers are locked when the wheels are moved back to balance the frame.

18. In a cultivator, the combination with the frame, of wheel spindles mounted thereon to swivel around vertical axes, a movable member, connections between said movable member and the wheel spindles, whereby the movement of the member will swivel said spindles, foot levers on the frame, connections between the foot levers and the movable member for operating the latter and swiveling the wheel spindles, means for shifting the wheel spindles forward and backward with reference to the frame to balance the latter, and means controlled by the shifting movement of the wheels, to lock the foot levers against action; whereby when the wheels are shifted to balance the frame, they will be prevented from swiveling.

19. In a cultivator, the combination of the main frame, spindle-carrying frames mounted thereon and movable around vertical axes, fore and aft links pivoted at their rear ends to said frames on a horizontal transverse axis, a transversely movable drag-bar support connected with the forward ends of said links, drag-bars on the support, means for moving the support transversely, and means for shifting the spindle-carrying frames on their pivotal connection with the links.

20. In a cultivator, the combination of the main frame, spindle-carrying frames mounted thereon and movable around vertical axes, fore and aft links pivoted at their rear ends to the spindle-carrying frames on a horizontal transverse axis, a transversely movable drag-bar support pivoted to the front ends of said links on vertical axes, drag-bars on the support, a lever mechanism mounted on the frame and connected with the support to move the same transversely, and means for shifting the spindle-carrying frames on their pivotal connections with the links.

21. In a cultivator the combination of the main frame, the arched axle mounted therein and movable around a horizontal transverse axis, vertical frames 30 mounted to swivel on the vertical ends of the axle, horizontal wheel-spindles on the lower ends of said frames, fore and aft links pivoted at their rear ends to the upper ends of the vertical frames on a horizontal transverse axis; whereby the lower ends of the frames may be swung back and forth with reference to the links, a transversely movable drag-bar support pivoted to the forward ends of the fore and aft links on vertical axes, drag-bars carried by said support, foot levers mounted on the frame and connected with the support to move it endwise, a hand lever, and operative connections between the hand lever and the vertical frames 30 to shift said frames on their pivotal connection with the links.

22. In a cultivator, the combination with the wheeled frame, of the transversely extending endwise movable drag-bar support, means for moving the support transversely, drag-bars sustained slidingly on said support, an adjusting lever sustained by the support on an axis extending transversely thereof, and connections between the drag-bars and said lever on opposite sides of its pivotal axis; whereby the shifting of the lever will move the drag-bars to and from each other, and means for holding the parts in the adjusted position.

23. In a cultivator, the combination of the wheeled frame, the transversely extending rock shaft 14 mounted in said frame and movable endwise with relation to the same, means controlled by the rocking motion of the shaft for balancing the frame, sleeves mounted loosely on the shaft drag-bars connected with said sleeves, a sleeve 21 mounted loosely on the shaft and held against endwise movement thereon, an adjusting lever pivoted to said sleeve 21, connections between said lever at opposite sides of its pivot, and the said drag-bar sleeves, and means for locking the lever in different positions.

24. In a cultivator, the combination of the wheeled frame, a transversely movable drag-bar support sustained thereby, means for moving the support, drag-bars carried by the support and movable to and from each other thereon, an adjusting lever sustained by the support movable bodily therearound and pivoted on an axis extending transversely with reference to the movement of the support, connections between said lever and the drag-bars, means for locking the lever in its different positions when moved on its pivotal axis, and a transversely extending bar on the frame on which said lever rests and by which it is prevented from shifting around the shaft; whereby the shaft may be rocked without changing the position of the lever, and whereby said lever is at all times within the reach of the driver.

25. In a cultivator, the combination with the wheeled frame comprising forwardly extending frame-bars 3 and 4, of a seat frame connected at its forward end to said frame-bars, and extending rearwardly, a driver's seat supported on said seat frame, a transversely movable drag-bar support sustained by the wheeled frame, foot levers pivoted to the seat frame, and connections between the foot levers and the drag-bar support.

In testimony whereof I hereunto set my hand this 7th day of March, 1908, in the presence of two attesting witnesses.

ALEXUS C. LINDGREN.

Witnesses:
C. R. STEPHENS,
J. L. IRVING.